United States Patent Office 3,147,285
Patented Sept. 1, 1964

3,147,285
EPOXY ORGANOTIN COMPOUNDS
Gerry P. Mack, Jackson Heights, N.Y., assignor, by mesne assignments, to M & T Chemicals Inc., New York, N.Y., a corporation of Delaware
No Drawing. Filed July 20, 1956, Ser. No. 599,003
11 Claims. (Cl. 260—348)

The present invention relates to novel organotin compounds, and more particularly to organotin compounds useful as stabilizers for resin compositions and to stabilized resin compositions containing novel organotin compounds.

Synthetic resins are widely used and the applications of such resins are constantly increasing in scope. These resins are subject to degradative effects during working and in service under the influence of heat and/or light, and are "stabilized" to improve their properties. To be a useful stabilizer for resin compositions, the chemical utilized must be effective in preventing thermal and light degradative effects and must also be compatible with the other components of the resin composition, which may include such materials as plasticizers, solvents, fillers, etc. Dibutyltin dilaurate, one of the most effective and widely used stabilizers, is considered to have excellent "compatibility" by present standards. However, under severe working conditions it has a tendency to sweat out or exude, giving an oily or greasy film, thus limiting the conditions under which the resin may be worked.

It has now been discovered that novel organotin compounds containing one or more epoxy groups are effective and useful stabilizers. They are superior stabilizers in preventing degradative effects in resins. They also exhibit compatibility characteristics superior to those found in present organometallic stabilizers.

It is an object of the present invention to provide epoxidized organotin compounds.

Another object of the invention is to provide stabilized resin compositions containing epoxidized organotin compounds.

The invention also contemplates providing novel epoxidized hydrocarbontin compounds.

It is also an object of the invention to provide novel epoxidized organotin compounds having tin to sulfur bond(s).

Another object of the invention is to provide epoxidized organotin compounds having tin to nitrogen bond(s).

Still another object of the invention is to provide novel epoxidized organotin compounds having tin to oxygen bond(s).

Among the further objects of the invention is the provision of a process for producing epoxidized organotin compounds.

Other objects and advantages will be apparent from the following description and claims.

Broadly stated, the present invention provides novel organotin compounds containing at least one epoxy (oxirane oxygen) group. These novel compounds are utilized as a component of stabilized resin compositions. The epoxy group(s)

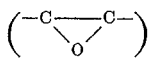

is present as a part of an organic group, which is bonded directly to tin through carbon, or bonded to tin through an oxygen atom, a sulfur atom, or a nitrogen atom. The compounds of the present invention contain at least one of the following groupings of elements and radicals:

(1) —Sn—O—R
(2) —Sn—S—R
(3) —Sn—N—R
(4) —Sn—R wherein R is defined as an organic epoxy-containing group.

The epoxy-containing organotin compounds of the present invention may be prepared in a number of ways. All of these organotin compounds contain at least one organic epoxy-containing group. The organic group may be epoxidized before it is reacted with an organotin to form the epoxy-containing organotin compound, or the organic compound (not yet containing an epoxy group) may be reacted with a tin-containing compound and this reaction product, in turn, epoxidized to place one or more epoxy groups in the structure. For example, an epoxy group may be prepared at the unsaturated (double bond) carbons of methyloleate to form the methylepoxy stearate, which is then reacted with an alkyltin oxide to form an epoxy-containing organotin compound. In like manner, methyloleate may be reacted with an alkyltin oxide to prepare an organotin-ester which is then epoxidized at the unsaturated carbons of the oleate radical.

The epoxy-containing organotin groups are designated R and/or R' and/or R'' throughout the specification. At least one of these groups must be present in a molecule that also contains a tin atom to be within the scope of this invention. R, R' and R'' may be aliphatic, cycloaliphatic, aralkyl, and alkaryl. The aralkyl and alkaryl groups contain one or more epoxy groups in the one or more aliphatic substituents attached to the aromatic ring. Organic groups that may be epoxidized include substituted and unsubstituted unsaturated acids (e.g., oleic acids), unsaturated alcohols (e.g., allyl alcohol) and generally the unsaturated aliphatic and cycloaliphatic groups, e.g., vinyl, cyclohexenyl, vinyl cyclohexenyl, allyl, heptenyl, etc.

Compounds containing —Sn—O—R are generally described by the formula $R'''_a Sn(OR)_{4-a}$, wherein $a$ equals 1, 2, or 3. Compounds containing the group —Sn—S—R are generically described by the formula $R'''_a Sn(SR)_{4-a}$. Compounds containing the group —Sn—N—R are generically described by the formula $R'''_a Sn(NR)_{4-a}$. Compounds containing the group —Sn—R are generically described by the formula $R_x SnR'''_{4-x}$, wherein $x$ equals 1, 2, 3, or 4. Compounds containing more than one of the four groups specified above are operative and within the scope of the invention, e.g.,

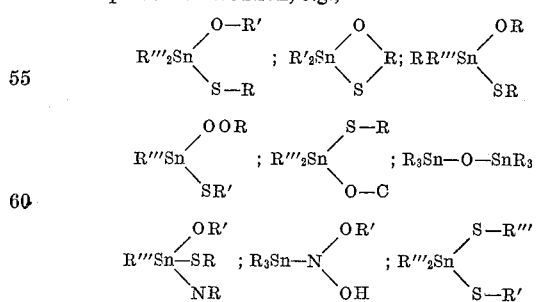

etc. R''' includes substituted and unsubstituted aliphatic, cycloaliphatic, aromatic and heterocyclic groups. The permissible substituents being radicals or groups not reactive with other constituents of the organotin molecule—and not deleterious to the functions of the "epoxy" tin compounds in service. Specific examples of substituted R‴ groups include dimethylaminophenyl, di-o-hydroxyphenol, triethyl-5-bromoamyl, trimethylethyl, triphenylcarboxyphenol, etc.

The invention also includes epoxidized organotin compounds where the tin atom is a part of a complex. This type of complex is often called a coordination or "Werner" type compound.

Compounds in which the epoxy-containing organotin group is bonded to tin through oxygen include (i) the reaction product of an organotin compound with substituted and unsubstituted carboxylic acids and polycarboxylic acids, (ii) alcoholates and phenolates, prepared from alcohols, polyhydric alcohols and phenols, (iii) alkyd polymers containing tin atoms in the polymer chain or network, the tin atoms being joined to oxygen atoms in the alkyd chain, (iv) the reaction products of organotin oxides and esters, herein called organotin oxide-ester reaction products, (v) polymeric tin compounds containing a plurality of R‴$_2$SnO groups which are linked to each other through oxygen, and (vi) combinations of the above, e.g., compounds such as

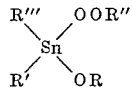

etc.

The compounds formed by the reaction of organotin compounds and carboxylic acids and polycarboxylic acids have general formulas of the type

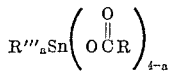

Alcoholates have general formulas of the type $$R'''_aSn(OR)_{4-a}$$

For a phenolate, the general formula is of the type

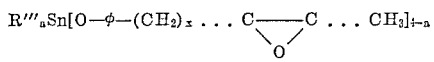

Epoxy-containing organotins with the tin-oxygen linkage may be prepared by standard methods for preparing alkoxy and aryloxy type compounds, and include:

(a) Reacting a desired epoxy-substituted alcohol with a halostannane (e.g. dioctyltin dichloride) in the presence of a hydrogen halide absorbing material.

(b) Reacting directly a desired epoxy-substituted alcoholate with an organotin halide.

(c) Reacting an organo-substituted tin alkoxide, preferably a lower alkoxide, i.e., methoxides, with an epoxy containing alcohol.

These compounds may also be prepared by reacting organotin oxide with epi-chlorohydrin as exemplified in the following equation:

(5)
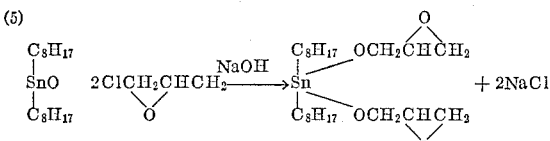

The alkyds are polymeric esters resulting from the reaction of a polyhydric alcohol with a polycarboxylic acid. The organotin alkyds contain tin atoms in the polymeric chain joined to oxygen of the alkyd. These are usually prepared by reacting an organotin compound, such as alkyl or aralkyl tin oxide with an alkyd, or, by forming the organotin alkyd in situ by reacting an organotin compound with a polyhydric alcohol and a polycarboxylic acid. The resulting product, the organotin alkyd contains tin atoms joined to the polymeric chain or network through oxygen. The tin atoms also usually are joined directly to hydrocarbon constituents of the original organotin compounds utilized in the formation of the organotin alkyd. It is contemplated that the epoxy-containing organic radicals be introduced into the organotin alkyd as a constituent of the hydrocarbon portion of the polyhydric alcohol or polycarboxylic acid utilized in the formation of the alkyd. Alternatively, at least one organic or hydrocarbon group attached to the tin in the alkyd polymer must contain at least one unsaturated linkage which is epoxidized to introduce the epoxy group into the alkyd polymer.

The organotin oxide-ester reaction products are complex, and contain:

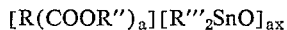

wherein $a$ has a value of 1, 2, or 3 and $x$ is a small number usually less than 3. They are prepared by reacting an organotin oxide with an ester.

When 1 mole of the organotin oxide is combined with 1 mole of the ester, it is believed that the product is of the following structural form:

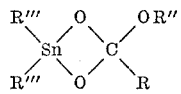

The type of reaction product obtained by the reaction of an organotin oxide and an ester is dependent upon the proportions of the various reactants utilized and the reaction conditions employed. The exact structure of these materials is extremely difficult to determine, as techniques for determination of accurate molecular structure characteristics are difficult and the results not definitive. The complex compounds are best described merely as reaction products. The materials will vary from wax to viscous liquid, to a fluid liquid, dependent upon the reactants, reaction conditions, etc. The epoxidized esters used for preparing the reaction products are commonly formed from such acids as ricinoleic acid, linoleic acid, etc.

Reaction products of this oxide-ester type are formed by reacting an organotin oxide with mono-esters or with polyesters, preferably the di-, and tri-esters. The reaction products of an organotin oxide with epoxidized oils, e.g., epoxidized soya bean oil, are preferred stabilizers. Soya bean oil can be epoxidized to a relatively high oxirane content (5.8 to 6.0%). Other useful, neat's-foot oil, lard oil, etc. The reaction products of organotin oxides and the epoxidized diacetomonoglycerides of tallow, lard, cottonseed oil, soybean oil, etc. are further examples of this type of oxygen-linked epoxy-containing organotin compound. Oxide-ester reaction products may also be formed by reacting the oxide with complex esters formed by the esterification of polybasic and/or hydroxy acids with mono- or polyhydric alcohols. These complex esters are often of a polymeric nature. Among other esters that have reacted with organotin oxide to yield novel epoxy-containing compounds are esters containing the epoxy group(s) on cyclic portions of the ester, e.g., the reaction product of an organotin oxide and 3,4-epoxy-6-methylcyclohexylmethyl 3,4-epoxy-6-methylcyclohexanecarboxylate.

The epoxy group may be introduced at any of various stages in the preparation of the final product, dependent upon such factors as the materials utilized, operating conditions, equilibrium and kinetic characteristics of the system, etc. An ester formed by the reaction of allyl alcohol and oleic acid is reacted with an organotin oxide and then the organotin oxide-ester reaction product epoxidized. In like manner, either or both the allyl alcohol and the oleic acid could be epoxidized prior to the formation of the ester, or the ester (formed from the allyl alcohol and the oleic acid) could be epoxidized and then reacted with the organotin oxide to yield an epoxidized organotin compound. The latter is preferred.

The preparation of epoxy compounds, called epoxidation, may be carried out by conventional techniques, utilizing such reagents as peroxide, peracids, etc.; see "Organic Reaction," vol. VII, chapter 7 (1953). The epoxidation of unsaturated esters is advantageously carried out by reacting the unsaturated ester with an epoxidizing agent at a temperature between about —20° C. to about 60° C., preferably under anhydrous conditions. Organic peracids, such as peracetic acid, perbenzoic acid, monoperphthalic acid and the like, are usually effective epoxidizing agents for this type of reaction. It is preferred to carry out the reaction in a suitable mutual solvent for the reactants and products. Chloroform is an especially useful solvent for this purpose, but other materials such as ethyl ether, dichloromethane, benzene, ethyl acetate, etc. are also suitable. The epoxy-substituted esters may be recovered from the reaction mixture by any suitable means, such as distillation, extraction and the like.

Peroxytrifluoroacetic acid can also be used for epoxidation of unsaturated esters where the above per-acids give low yields or will not react. This acid will give good yields when used on such esters as ethyl acrylate, ethyl crotonate, methyl methacrylate, etc. Epoxy-containing compounds are very reactive and subject to an "opening" of the epoxy linkage when reacted with many organic compounds. Surprisingly, it has been discovered that the epoxidized esters react with organotin compounds to yield the reaction product with little or no destruction of the epoxy group(s), as determined by analysis.

Polymeric tin compounds containing a plurality of $R'''_2SnO$ groups linked together by tin to oxygen bonds are advantageously prepared by reacting an organotin dihalide with an epoxy-containing alkoxide or by reacting organotin oxide with an epoxy-containing ester. These alkoxides and esters may be prepared from epoxidized alcohols. These alcohols may be monohydric, or polyhydric and straight chain or branched. These epoxidized alcohols include: 2,3-epoxypropanol, 3,4-epoxybutanol, 2,3-epoxyhexanol, 5,6-epoxyoctanol, 3,4-epoxyhexanediol-1,6-2,3-dimethyl-4,5-epoxyoctanol, 2 - methoxy-4,5-epoxyoctanol, 2,3-epoxydodecanol, 9,10-epoxyoctadecanol, etc. The epoxy-containing alkoxides are prepared from initially unsaturated alcohols, as are those epoxy-containing esters with an epoxy group present in that portion of the molecule derived from the alcohol. Polymeric compounds may also be prepared by reaction of epoxy-containing esters of saturated alcohols, where the epoxy group is present in the acid reacted with the alcohol to form the ester, with an organotin compound.

The sulfur-containing epoxy tin compounds include the sulfur analogs of the oxygen compounds specified hereinbefore. The preparation of sulfur analogs of an alcoholate is illustrated below:

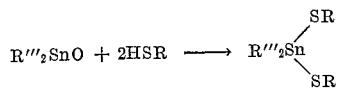

R may be substituted by such groups as ether, carboxylic, carboxylic ester, thiol, thioether, sulfhydryl, carboxylic amide, hydroxy, halogen, etc., which do not interfere with the formation of the compounds desired and which have no deleterious effect on the use(s) of the compounds. The preparation of an organotin derivative of a thiolacid is illustrated below:

which in turn may be reacted with a hydrocarbon acid to yield

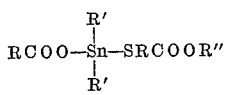

or with more of the same or another thiolacid to yield

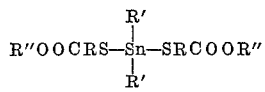

This latter type of compound may also be prepared as follows:

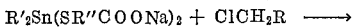

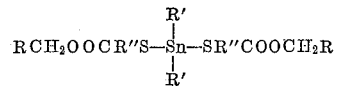

These compounds may be further reacted to produce sulfur and epoxy containing polymeric chains.

Another important group of epoxy-containing tin compounds wherein the tin is linked to the epoxy-containing portion of the molecule through a tin-sulfur bond are the organotin sulfide-ester reaction products:

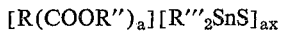

They may be prepared by reacting an organotin sulfide with an epoxidized ester, e.g., dibutyltin sulfide and butylepoxystearate. In a similar manner the reaction product of organotin sulfides and epoxidized oils and polyesters are formed.

The nitrogen-containing epoxy tin compounds include the tin derivatives of amines, the amidines, the N-alkyl amides, the N,N-dialkyl amides, the imido esters, the aldimines, the ketimines, etc.

Compounds of the present invention of a type containing the grouping —Sn—N—R may be prepared by the reaction of an organic nitrogen containing epoxy compound, wherein at least one reactive hydrogen atom is bonded to nitrogen with an organotin compound containing readily removable groups, e.g. organotin oxides, organotin halides.

Of particular importance are epoxidized organotin compounds containing oxygen, nitrogen and sulfur, or at least two of these three elements, and include organotin dithiocarbamates, isodithiocarbamates, dithiocarbonates, isothiocyanates, thiocyanates, sulfonamides, etc.

Compounds of the type Sn—R falling within the present invention wherein the epoxy bearing group is bonded to tin through carbon, may be prepared by Grignard synthesis of an organotin by reacting an alkenyl chloride, having the double bond on a carbon atom other than the No. 1 carbon, with magnesium, and a tin halide. The organotin thus formed, which has an unsaturated linkage in the alkenyl group bonded to the tin, is then epoxidized to yield an epoxy-containing organotin of the type

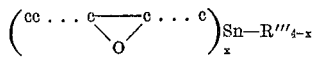

wherein $x$ equals 1, 2, 3 or 4. Compounds having the epoxy group in the 1-2 position may be prepared by the epoxidation of vinyltin compounds. Epoxidized alkylaryl organotin derivatives are prepared by epoxidation of alkenaryl organotin derivatives. Thus, p-epoxyethylphenyltin trichloride is prepared by the Grignard synthesis of p-vinylphenyl chloride with magnesium, and then with SnCl$_4$, followed by epoxidation to yield p-epoxyethylphenyltin trichloride. The di-, tri-, and tetra-derivatives are prepared by varying the process conditions.

The epoxidized organotin stabilizers of the present invention may be utilized in resin compositions in conjunction wth other organotin stabilizers, metallic stabilizer compositions, mercaptoacid esters, mercaptans, etc. Other compositions include stabilizer compositions as the reaction product of an epoxidized alcohol, maleic acid or anhydride, a diorganotin oxide and a mercaptan or mercaptoacid or alcohol ester. The epoxidized organotin stabilizers may also be utilized in conjunction with such stabilizers as epoxy esters, organic phosphites, and/or the metallic salts of fatty acids, e.g., the barium, cadmium, strontium, lead, zinc salts, alone or mixtures thereof, etc.

Between about 0.25% and about 7% of the organotin epoxy-containing compounds may be used to stabilize resin compositions. Preferably between about 0.5% and about 3% are used, the amount used being dependent on the resin employed, process conditions of compounding and working the resin, service conditions, economics, etc.

The following examples are further illustrative of the present invention. It is to be understood, however, that this invention is not restricted thereto.

EXAMPLE 1

Two-tenths mole of ethyl acrylate was dissolved in 250 ml. of ethylene dichloride. To this was added 1.44 moles of disodium hydrogen phosphate. This mixture was brought to a boil and while vigorously stirring 90 cc. of a solution of peroxytrifluoroacetic acid in 50 ml. of ethylene dichloride was added dropwise over a 30 minute period. Upon completion of this addition, the mixture was heated under reflux for 30 minutes. Water was added (650 cc.) and the solution stirred until the salts had dissolved. The organic layer was separated and the aqueous layer extracted with 100 ml. of methylene chloride. This organic extract was washed with 10% sodium bicarbonate solution and then dried over magnesium sulfate. The solvent was distilled off at reduced pressure, and the residual liquid then fractionated. Approximately 55% of ethyl glycidate was obtained, B.P. 88–90° C. at 60 mm. One mole of this product was dissolved in 200 ml. of toluene and while vigorously agitated 2 moles of dibutyltin oxide were slowly added. The reaction was continued at its boiling point for 20 minutes. The toluene was then distilled off. A yellow viscous product was obtained having 38.30% Sn; 2.52% oxirane O; theory, 38.32% Sn; 2.57% oxirane O.

EXAMPLE 2

One mole of glyceryl monooleate and 1 mole of maleic anhydride were reacted at 150–160° C. for 45 minutes. The product was dissolved in ethylene dichloride and epoxidized as in Example 1 with peroxytrifluoroacetic acid. The epoxidized product was then reacted with 2 moles of dibutyltin oxide. Found 24.5% Sn, 2.5% oxirane O; theory 24.75% Sn, 3.34% oxirane O.

EXAMPLE 3

Glyceryl dioleate was prepared by reacting 1 mole (282.46 gr.) of oleic acid with about 0.5 mole plus 10% excess of glycerol (50 gr.) at 165° C. for 6 hours with 2.0 gr. of p-toluene sulfonic acid as catalyst. When the product had an acid number of 10, it was cooled and 0.5 mole (311.5 gr.) of the above was reacted with 0.5 mole (74.5 gr.) of phthalic anhydride for 2.5 hours at 170° C. (until an acid number of 82 was reached). This product was epoxidized as in Example 1 and then reacted with 0.25 mole of bis tributyltin oxide, as in Example 1. Found 10.87% Sn, 2.49% oxirane O; theory 10.92% Sn, 2.65% oxirane O.

EXAMPLE 4

N-(n-hexyl)-9,10-epoxystearamide was prepared as per Scqalan, Swern and Roe, U.S. Patent No. 2,567,237. One-tenth mole of dioctyltin dimethoxide and 0.1 mole of the amide were dissolved in 200 ml. of toluene and heated at 125° C. until approximately 0.1 mole of methanol had distilled over. The toluene was removed by distillation. The remaining product was a waxy solid. Found 15.68% Sn, 1.89% oxirane O; theory 15.70% Sn, 1.91% oxirane O.

EXAMPLE 5

One-half mole of butylepoxystearate was dissolved in 100 parts of toluene. This solution was stirred rapidly and heated to 135° C. and then 0.5 mole of dibutyltin oxide was slowly added. A clear solution was formed and heating continued for about 30 minutes at this temperature. The product obtained had an oxirane oxygen content of 1.96% and a tin content of 19.63% theoretical 19.61. The original butylepoxystearate had an oxirane oxygen content of 3.66%; the theoretical value being 2.12%.

EXAMPLE 6

The procedure of Example 5 was followed, using 2 moles of dibutyltinoxide to 1 mole of butylepoxystearate. A clear yellow liquid was obtained and analyzed.

|  | Theory | An. |
| --- | --- | --- |
| Percent Sn | 27.85 | 28.19 |
| Percent Epoxy (as oxirane oxygen) | 1.52 | 1.51 |

EXAMPLE 7

One mole of methylepoxystearate, dissolved in toluene, is reacted with one mole of dioctadecyltin oxide, following the procedure of Example 5. The product contains 12.52% tin, and 1.36% oxirane oxygen.

EXAMPLE 8

One mole of n-octylepoxystearate, dissolved in Solvent No. 210 (commercial hydrocarbon solvent composed largely of heptane) is reacted with bis trioctyltin oxide. The product contains 17.7% tin, and 0.96% oxirane oxygen.

EXAMPLE 9

One mole of isooctylepoxystearate, dissolved in toluene, is reacted with bis trimethyltin oxide. The product contains 31.5% tin and 1.72% oxirane oxygen.

EXAMPLE 10

One mole of cyclohexylepoxystearate, dissolved in benzene, is reacted with 1 mole of dilauryltin oxide. The product contains 15.75% tin and 1.87% oxirane oxygen.

EXAMPLE 11

One mole of 2-chloroethylepoxystearate, dissolved in xylene, is reacted with 2 moles of diethyltin oxide. The product contains 31.9% tin and 1.83% oxirane oxygen.

EXAMPLE 12

One mole of phenylepoxystearate, dissolved in benzene, is reacted with 2 moles of dicyclohexyltin oxide. The product contains 24.31% tin and 1.35% oxirane oxygen.

EXAMPLE 13

One mole of glycidylepoxystearate, dissolved in kerosene, is reacted with 2 moles of diphenyltin oxide. The product contains 25.46% tin and 2.68% oxirane oxygen.

EXAMPLE 14

One mole of tetrahydrofurfurylepoxystearate, dissolved is Solvent No. 210 (commercial hydrocarbon solvent composed of largely of heptane) is reacted with 2 moles of dithienyltin oxide. The product contains 24.11% tin and 1.4% oxirane oxygen.

EXAMPLE 15

One mole of p-tert-butylphenylepoxystearate, is reacted with 2 moles of dibenzyltin oxide by heating for 30 minutes at 170° C. The product contains 22.23% tin and 1.32% oxirane oxygen.

EXAMPLE 16

One mole of epoxyoctadecylepoxystearate, is reacted with 2 moles of dimethyltin oxide, by heating for 30 minutes at 170° C. The product contains 26.55% tin and 3.29% oxirane oxygen.

EXAMPLE 17

One mole of butylepoxytallate, dissolved in toluene, is reacted with 2.0 moles of dinaphthyltin oxide. The product contains 20.51% tin and 0.57% oxirane oxygen.

EXAMPLE 18

One mole of butylepoxysoyate, dissolved in Solvent No. 210 (commercial hydrocarbon solvent composed chiefly of heptane) is reacted with 1.0 mole of bis(tri-4-chlorobutyltin) oxide. The product contains 22.87% tin and 1.62% oxirane oxygen.

EXAMPLE 19

One mole of epoxidized glycerolmono-ricinoleate triacetate, dissolved in benzene, is reacted with 2.0 moles of di-p-phenyltin oxide. The product contains 19.22% tin and 1.15% oxirane oxygen.

EXAMPLE 20

One mole of 2,3-epoxypropanol (glycidol) and 1 mole of triethylamine are dissolved in 200 cc. of toluene. This solution is stirred vigorously and held at 0° to 10° C. while 0.5 mole of dibutyltin dichloride dissolved in 150 cc. of toluene is added slowly. The triethylamine hydrochloride formed in the reaction is filtered off and the solvent stripped off under vacuum. The resulting ester

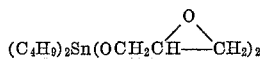

analyzed:

|  | Theoretical | Analysis |
| --- | --- | --- |
| Percent Sn | 31.13 | 31.09 |
| Percent oxirane O | 8.44 | 8.4 |

This type of reaction may be carried by simply mixing the desired halostannane with the alcohol in an inert solvent such as toluene or benzene, in the presence of a hydrogen halide absorbing material at relatively low temperatures. The reactants are usually employed in substantially stoichiometrically amounts. The reaction is preferably carried out at a temperature of 10° to 30° C. The material(s) used to absorb or neutralize the hydrogen should not react with the halostannane or the epoxy group, nor should it cause polymerization of the epoxide. Preferably materials are the rather weak inorganic bases and tertiary amines, such as triethylamine, triamylamine, pyridine and the like.

EXAMPLE 21

One-half mole of dibutyltin dichloride, dissolved in ether was added slowly to 1.0 mole of sodium 2-3 epoxypropoxide, dissolved in diethyl ether. After all the dibutyltin dichloride had been added the reactants were refluxed for one hour. The salt was filtered off and the ether stripped off.

|  | Analysis | Theoretical |
| --- | --- | --- |
| Percent Sn | 31.06 | 31.13 |
| Percent oxirane O | 8.37 | 8.44 |

EXAMPLE 22

One mole (54 gr.) of sodium methylate were dissolved in 400 gr. of absolute methanol. To this solution 0.5 mole (151.9 gr.) of dibutyltin dichloride dissolved in 200 gr. methanol were slowly added. The temperature rose rapidly and was maintained at 15-25° C. After the reaction was completed the salt was filtered off and the methanol distilled off, under vacuum. The liquid product was dibutyltin dimethoxide. One-tenth mole of this product was heated with 0.2 mole of 5,6-epoxyoctanol at 90-100° C., while slowly bubbling nitrogen gas into the mixture. During this time methanol was slowly distilled out until approximately (95%) of the theoretical amount was recovered. The remaining liquid product was di(5,6-epoxy octoxy)-dibutyl stannane.

EXAMPLE 23

One-tenth mole (25.3 gr.) of dibutyltin oxide and 0.05 mole (47.0 gr.) of an epoxidized soya bean oil having an oxirane oxygen of 5.8% was reacted at 150–165° C. for about 40 minutes. The product was a yellowish viscous liquid which analyzed:

|  | Analysis | Theoretical |
| --- | --- | --- |
| Percent Sn | 16.47 | 16.52 |
| Percent Oxirane O | 3.44 | 3.83 |
| Sapon No | 115.6 | 116.70 |

EXAMPLE 24

The preceding experiment was repeated by using a molar ratio of one mole of dibutyltin oxide to one mole of epoxidized soya bean oil. The reaction temperature was raised to 190° C. for 20 minutes. As soon as a clear product was obtained indicating that all the dibutyltin oxide had reacted with the oil, the flask was cooled. The product is a yellowish, slightly viscous product.

|  | Analysis | Theoretical |
| --- | --- | --- |
| Percent Sn | 10.04 | 10.03 |
| Percent Oxirane O | 4.32 | 4.65 |

EXAMPLE 25

Two moles of dibutyltin oxide were reacted with 1 mole of butylepoxystearate. Two-tenths of a mole of this reaction product was then reacted with two-tenths of a mole of isooctyl mercaptoacetate and then heated for 30 minutes at 140° C. The reaction product was a viscous orange colored material and had the odor of buytl alcohol.

|  | Analysis | Theoretical |
| --- | --- | --- |
| Percent Sn | 24.97 | 24.95 |
| Percent S (mercapto) | 3.22 | 3.40 |
| Percent Oxirane O | 0.46 | 1.21 |

EXAMPLE 26

A stabilizer was prepared by mixing 1 part of dibutyltin bis(isooctyl maleate) and 1 part of the reaction product of isooctyl mercaptoacetate (1 mole) and the product (1 mole) of Example 6 (reaction product of 2 moles of dibutyltin oxide and 1 mole of butylepoxystearate).

EXAMPLE 27

A stabilizer was prepared by mixing 1 part of isooctyl mercaptoacetate and 1 part of the product of Example 6.

EXAMPLE 28

A stabilizer was prepared by mixing 1 part of dibutyltin bis(isooctyl maleate) and 1 part of the product of Example 6.

EXAMPLE 29

*Dibutyltin-S-(Dodecyl Mercaptido) N[N(2,3-Epoxypropyl) p-Toluene Sulfonamide]*

One mole of dibutyltin oxide was reacted with 1 mole of dodecyl mercaptan. One mole of N(2,3-epoxypropyl) p-toluene sulfonamide was then added and then refluxed at 105° C. After the reaction occurred and water was evolved, a tan colored solid was obtained.

EXAMPLE 30

*Dibutyltin-S-(Isooctyl Mercaptoacetate) N[N(2,3-Epoxypropyl) p-Toluene Sulfonamide]*

The procedure of Example 29 is followed except that isooctyl mercaptoacetate is substituted for the dodecyl mercaptan yielding a similar product.

EXAMPLE 31

One-half mole of p-(2,3-epoxypropoxy) phenyl urea was reacted with 0.5 mole of a 10% aqueous solution of NaOH. A slight excess of NaOH was added so as to have a slightly alkaline solution. One-fourth mole of dibutyltin dichloride, dissolved in 200 ml. of toluene, was then added slowly. When the addition was completed, the reactants were refluxed for 30 minutes at 115° C. The product, after stripping of the toluene, had the following analysis:

|  | Analysis | Theoretical |
|---|---|---|
| Percent Sn | 18.10 | 18.44 |
| Percent Oxirane O | 4.00 | 4.46 |

EXAMPLE 32

*Dibutyltin N,N'-Bis[N(2,3 Epoxypropyl) p-Toluene Sulfonamide]*

Two-tenths of a mole of dibutyltin oxide and 0.4 mole of N(2,3-epoxypropyl) p-toluene sulfonamide, were reacted in the presence of 100 cc. of toluene. During the course of the reaction water was evolved. The product was a light tan power analyzing 10.34% sulfur, 17.22% tin and 2.20% oxirane oxygen.

EXAMPLE 33

One mole of dibutyltin oxide was reacted with 1 mole of 2,2'-(2-ethylhexanamido) diethyl di-epoxy stearate and heated at 172° C. for 32 minutes. The product was an orange colored translucent liquid.

EXAMPLE 34

*Di[p-(Epoxyethyl) Phenyl]Tin Bis(9,10-Epoxystearate)*

One mole of bis p-vinylphenyltin dichloride dissolved in ethyl alcohtol and 2 moles of sodium oleate were reacted and then treated with peracetic acid to yield di-[p-(epoxyethyl) phenyl]tin bis(9,10-epoxystearate).

EXAMPLE 35

One mole (265 gr.) of dibuyltin sulfide and 0.5 mole (177.3 gr.) of butylepoxystearate were reacted at 170° C. and kept at this temperature for 30 minutes and then allowed to cool. The material was under constant agitation. The product was a reddish orange liquid.

EXAMPLE 36

*Di(Epoxyethyl)Tin Bis(9,10-Epoxystearate)*

Two moles (81.4 gr.) of sodium hydroxide were dissolved in 6000 cc. of distilled water. Two moles of oleic acid were then added slowly. When this reaction was completed, the pH was adjusted to 7.0. A solution of divinyltin dichloride in 250 cc. of ethyl alcohol was prepared and added slowly to the sodium oleate at 50° C. Divinyltin dioleate precipitated and was washed until free of chloride and air dried. Seven hundred and nine grams were collected. This was then epoxidized using peroxytrifluoroacetic acid, to yield di(epoxyethyl)tin bis(9,10-epoxystearate).

EXAMPLE 37

*Reaction Product of Dibutyltin Oxide and 3,4-Epoxy-6-Methylcyclohexylmethyl 3 - Epoxy-6-Methylcyclohexanecarboxylate*

Two moles (505.4 gr.) of dibutyltin oxide and 1 mole (280.4 gr.) of 3,4-epoxy-(3 and/or 4)-methylcyclohexanecarboxylate were added to a flask. A glass stirrer, condenser with drying tube, and thermometer and well were connected. The reactants were stirred and heated slowly to a temperature of 167° C. at which point a clear solution resulted. It was then heated at 170° C. for 30 minutes and allowed to cool slowly. Seven hundred eighty and two-tenths grams of product were collected. Seven hundred eighty-five and eight-tenths theoretical. Yield 99.5%.

|  | Analysis | Theoretical |
|---|---|---|
| Percent Sn | 30.23 | 30.33 |
| Percent Oxirane O | 3.85 | 4.07 |
| Acid No | 66.5 | 71.3 |
| Sapon No | 71.7 | 71.3 |

EXAMPLE 38

*Reaction Product of Dibutyltin Oxide and Epoxyethyl Acetate*

Epoxyethyl acetate was prepared by reacting the reaction product of trifluoroacetic acid, hydrogen peroxide and ethylene dichloride, with disodium hydrogen phosphate, ethylene dichloride and vinyl acetate, and extracting the epoxyethyl acetate. One mole of the epoxy-ethyl acetate (102.1 gr.) was refluxed with 1 mole (252.7 gr.) of dibutyltin oxide, in 100 ml. of toluene, until a yellowish viscous opaque material formed. The toluene was stripped and the yellowish orange pasty material obtained, having the following analysis:

|  | Analysis | Theoretical |
|---|---|---|
| Percent Sn | 33.80 | 33.78 |
| Percent Oxirane O | 4.31 | 4.53 |
| Acid No | 75.2 | 79.5 |
| Sapon No | 158.7 | 159 |

EXAMPLE 39

*Reaction Product of Dibutyltin Oxide and Epoxyethyl 2-Ethylhexoate*

One mole of epoxyethyl 2-ethylhexoate, prepared from vinyl 2-ethylhexoate following the procedure of Example 38, was refluxed with 2 moles of dibutyltin oxide, in 100 ml. of toluene, until a yellowish translucent solution formed. The toluene was stripped at reduced pressure, yielding a yellow-orange solid residue when cooled. The residue had the following analysis:

|  | Analysis | Theoretical |
|---|---|---|
| Percent Sn | 34.51 | 34.45 |
| Percent Oxirane O | 2.22 | 2.31 |
| Acid No | 80.1 | 81.2 |
| Sapon No | 81.3 | 81.2 |

EXAMPLE 40

Diethyl 2,3-epoxypropyl malonate (108.1 gr.) was slowly added, with rapid agitation, to sodium methylate (27 gr.) dispersed in toluene, at 10–15° C. A 30% solution of trihexyltin chloride (682.7 gr.) dissolved in toluene was then slowly added and the mixture held for three and one-half hours at 10–20° C., until the reaction mixture became neutral. The product analyzed:

|  | Theoretical | Analyzed |
|---|---|---|
| Percent Sn | 20.11 | 20.15 |
| Percent Oxirane O | 2.70 | 2.72 | and is believed to have the following structural formula:

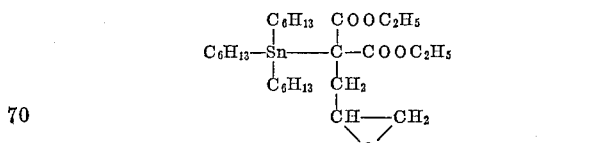

Similarly, reaction products of malonic esters, e.g., dimethyl, 2-ethylhexyl, benzyl, cyclohexyl, and tetrahydropropylmalonates, are prepared. In general, compounds containing active methylene groups, such as the malonic esters, are useful in this synthesis.

A general method was used to test the effectiveness of the products of this invention as stabilizers for resins. The stabilizer was incorporated into a mixture of 100 parts by weight of polyvinyl chloride resin (Geon 101 EP) and 50 parts by weight of a plasticizer (dioctyl phthalate). One or two parts of stabilizer per 100 parts of resin were used. The mix was milled for 5 minutes on a 2-roll differential speed mill which was heated to temperatures of 320–325° F., and removed as a sheet. The sheet was cut into 1″ by 6″ strips and placed in a circulating air oven held at 350° F. Samples were removed after 15, 30, 45, 60, 75 and 120 minutes. Samples were rated visually, using the following color code: 1—dark amber, 2—light amber, 3—tan, 4—yellow, 5—pale yellow, 6—faint yellow and 7—colorless.

APPEARANCE AFTER HEAT AGING

| Stabilizer from Example No. | Parts | Milled Sheet | 15 | 30 | 45 | 60 | 75 | 120 |
|---|---|---|---|---|---|---|---|---|
| Dibutyltin dilaurate | 2 | 7 | 4 | 3 | 2 | 1 | | |
| Ex. 6 | 2 | 7 | 5 | 4 | 3 | 3 | | |
| Ex. 23 | 2 | 7 | 5 | 4 | 3 | 2 | | |
| Ex. 24 | 2 | 7 | 5 | 4 | 3 | 3 | | |
| Ex. 25 | 2 | 7 | 7 | 6 | 6 | 5 | 4 | 3 |
| Ex. 26 | 2 | 7 | 7 | 6 | 6 | 4 | 4 | 3 |
| Ex. 27 | 1 | 7 | 6 | 6 | 5 | 5 | 4 | 3 |
| Ex. 28 | 2 | 7 | 6 | 6 | 5 | 4 | 4 | 3 |
| Ex. 29 | 1 | 7 | 7 | 6 | 5 | 4 | 4 | 2 |
| Ex. 31 | 2 | 7 | 6 | 5 | 4 | 3 | 2 | |
| Ex. 32 | 2 | 7 | 6 | 5 | 4 | 2 | 2 | 1 |
| Ex. 33 | 2 | 7 | 6 | 5 | 4 | 2 | 2 | 1 |
| Ex. 35 | 2 | 7 | 6 | 4+ | 4+ | 4 | 4 | |

In addition to the heat tests detailed hereinbefore which illustrate the stabilizing properties of the epoxy-containing tin compounds when compounded in a plasticized vinyl resin, it has also been found that these compounds stabilize other plasticized and unplasticized resin compositions.

Two samples containing 25 grams of chlorinated rubber (67% chlorine), dissolved in 75 grams of toluene were prepared. The first sample was mixed with 3% of the reaction product of dioctyltin oxide and butylepoxy-stearate and 5% dibutyl phthalate. The second sample was formulated with only the 5% dibutyl phthalate. Films were cast on glass and heated in an air circulating oven held at about 140° C. for 35 minutes. The film prepared from the first sample had a very pale yellow cast, whereas the film prepared from the second sample turned a pale amber.

Two samples comprising 100 parts of a polymer containing vinyl chloride (60%) and vinylidene chloride (40%) were dry blended with 30 parts of dioctyl phthalate. To the first sample, two parts of the reaction product of dibutyltin sulfide and ethylepoxystearate were added during the dry blending. Each of the samples was then worked on a rubber mill at about 300° F. for 40 minutes. The first samples, which included the epoxy-containing organotin stabilizer, had a very pale yellow tint, whereas the second sample (unstabilized) was a dark yellow.

Two samples comprising 25 parts of copolymer of vinyl chloride (80%) and vinyl acetate (20%) were dissolved in 75 parts of acetone. Two parts of the stabilizer composition of Example 23 and two parts of dioctyl adipate were added to the first sample, whereas only two parts of dioctyl adipate were added to the second sample. A three-mil film of each sample was cast on a glass plate, the solvents evaporated and the films subjected to the heat stability test in an air circulating oven at 350° F. After 30 minutes the first sample stabilized was practically colorless, whereas the second sample had turned to a "gold" color.

The epoxy-containing organotin stabilizers of this invention are effective for the stabilization of vinyl halide polymer resin compositions that do not contain plasticizers. Such compositions are known as "rigids." The stabilizers are particularly useful and effective in these rigid compositions in that a high percentage of an organotin may be incorporated in a compatible form and all of the stabilizer molecule is effective in the stabilization of the resin. Rigid vinyl resin compositions stabilized with one and one-half parts of the reaction product of dibutyltin oxide and epoxybutylstearate, and including in the resin formulation one and one-half parts of dibutyltin di(isooctyl mercaptoacetate), exhibit excellent resistance to the deteriorative effects of heat and light.

The epoxy-containing organotins are also effective stabilizers for organosols and plastisols. The epoxy-containing organotins have the important advantage that they are extremely compatible in formulations containing large amounts of plasticizers. Plasticizers commonly used in such formulations include esters of the following acids: phthalic acid, adipic acid, sebacic acid, azelaic acid, citric acid, aconitic acid, tricarballic acid, maleic, fumaric, succinic, malonic acid, phosphoric acid, and mercapto acids like thioglycolic acids and the like; esters of dihydric and polyhydric alcohols, such as glycol, glycerol, pentaerythritol, sorbitol and the like; esters of thioglycols and other sulfur-containing derivatives; amino alcohol derivatives; ester amides; sulfonamides and other amides; chlorinated plasticizers; carbonic acid derivatives derived from phosgene.

The epoxy-containing organotin compounds of the present invention are superior stabilizers. They have excellent stabilization properties in that they prevent the heat and light degradative effects normally associated with the working of vinyl resins. Resins stabilized with these compounds exhibit unusual light stability. The epoxy-containing organotin compounds that include sulfur in the molecule have excellent stabilization properties without the malodor that heretofore has characterized stabilization with sulfur containing compounds. In addition to their stabilization properties, the epoxy-containing organotins exhibit markedly superior compatibility characteristics when compounded with vinyl compositions, such as rigids, elastomers, plastisols, organosols, etc.

Other halogen-containing resins, which are rendered heat and light resistant by the compounds of this invention, are, for instance, polymers of vinyl chloride and vinyl resins containing vinyl chloride units in their structure, such as copolymers of vinyl chloride with vinyl esters of aliphatic carboxylic acids, particularly vinyl acetate; copolymers of vinyl chloride with esters, nitriles and amides of unsaturated carboxylic acids, e.g. of acrylic and methacrylic acid; copolymers of vinyl chloride with diene compounds and with unsaturated dicarboxylic acids or their anhydrides, such as copolymers of vinyl chloride with diethyl maleate diethyl fumarate or maleic anhydride; after-chlorinated polymers and copolymers of vinyl chloride; polymers of vinylidene chloride and copolymers of the same with vinyl chloride and other polymerizable compounds; polymers of vinyl chloroacetate and dichlorodivinyl ether; chlorinated polymers of vinyl acetate, chlorinated polymeric esters of acrylic and alpha-substituted acrylic acids; polymers of chlorinated styrenes for instance dichlorostyrene; chlorinated rubber; chlorinated polymers of ethylene; polymers and after-chlorinated polymers of chlorobutadienes, and their copolymers with vinyl chloride; rubber hydrochloride and chlorinated rubber hydrochloride; and mixtures of the polymers recited herein with each other or other polymerizable compounds. The corresponding bromides and fluorides are equally well stabilized.

The epoxidized organotin compounds of this invention are also useful as monomers to form organotin-containing polymers. Polymerization occurs by a mechanism involving the opening of the oxirane ring. Homopolar polymers prepared from these epoxy-containing organotin compounds, and copolymers prepared by copolymerization with other types of epoxy-containing materials, have a wide range of properties, dependent upon the monomers, and the reaction conditions, utilized.

While the invention has been described with particular reference to specific embodiments, it is to be understood that it is not limited thereto but is to be construed broadly and restricted solely by the scope of the appended claims.

What is claimed is:

1. A compound selected from the class consisting of compounds having the formulas $R'_aSn(OR)_{4-a}$, $$R'_aSn(SR)_{4-a}$$

$R'_aSN(NR)_{4-a}$, $R'_aSnR_{4-a}$, wherein $a$ is a numeral from 1 to 3, R is a radical composed of carbon, hydrogen, and oxygen, and contains at least one vic-epoxy group, and R' is a group selected from the class consisting of alkyl and monocyclic aryl groups.

2. A compound as set forth in claim 1 in which (OR) is a radical selected from the class consisting of carboxylic acid and polycarboxylic acid radicals.

3. A compound as set forth in claim 1 in which (OR) is an alkoxy radical.

4. A compound as set forth in claim 1 in which (OR) is a phenoxy radical.

5. Diethyl α-trihexylstannyl-2,3-epoxypropylmalonate.

6. Di(epoxyethyl)tin bis(9,10-epoxystearate).

7. Di[p-epoxyethyl)phenyl]tin bis(9,10-epoxystearate).

8. Dibutyltin N,N'-bis[N(2,3-epoxypropyl) p-toluene sulfonamide].

9. Dibutyltin-S-(isooctyl mercaptoacetate) N[N(2,3-epoxypropyl) p-toluene sulfonamide].

10. Di(5,6-epoxyoctyl)-dibutyl stannane.

11. Di(2,3-epoxypropoxy)-dibutyl stannane.

References Cited in the file of this patent

UNITED STATES PATENTS

| | | |
|---|---|---|
| 2,221,771 | Alquist et al. | Nov. 19, 1940 |
| 2,307,157 | Quattlebaum et al. | Jan. 5, 1943 |
| 2,501,026 | Cahnmann | Mar. 21, 1950 |
| 2,595,619 | Voorthuis | May 6, 1952 |
| 2,609,355 | Winkler | Sept. 2, 1952 |
| 2,631,990 | Mack et al. | Mar. 17, 1953 |
| 2,684,353 | Greenspan et al. | July 20, 1954 |
| 2,700,675 | Mack et al. | Jan. 25, 1955 |
| 2,727,917 | Mack et al. | Dec. 20, 1955 |
| 2,730,532 | Martin | Jan. 10, 1956 |
| 2,771,472 | Ritter et al. | Nov. 20, 1956 |
| 2,810,733 | Greenspan | Oct. 22, 1957 |
| 2,856,369 | Smith et al. | Oct. 14, 1958 |
| 2,972,595 | Bavley et al. | Feb. 21, 1961 |
| 3,095,427 | Kelso | June 25, 1963 |

OTHER REFERENCES

Chem. Abstracts, The Naming and Indexing of Chemical Compounds, volume 46, December 1952, page 5964.

Fuson: Advanced Organic Chemistry, published by John Wiley & Sons, New York, copyright 1950, page 230.

Luijten et al.: Investigations in the Field of Organotin Chemistry, published by Tin Research Institute, Middlesex, England, October 1955, pages 22 and 23.